US012471837B2

(12) United States Patent
Bose et al.

(10) Patent No.: US 12,471,837 B2
(45) Date of Patent: Nov. 18, 2025

(54) PATIENT MONITORING AND TREATMENT USING IMPLANTED BIOSENSORS

(71) Applicant: International Business Machines Corporation, Armonk, NY (US)

(72) Inventors: Tathagato Bose, Kolkata (IN); Sourav Bhattacharjee, Durgapur (IN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 17/567,304

(22) Filed: Jan. 3, 2022

(65) Prior Publication Data
US 2023/0210449 A1    Jul. 6, 2023

(51) Int. Cl.
*A61B 5/00* (2006.01)
*A61B 5/01* (2006.01)

(52) U.S. Cl.
CPC .............. *A61B 5/4528* (2013.01); *A61B 5/01* (2013.01); *A61B 5/4836* (2013.01); *A61B 5/6847* (2013.01); *A61B 5/7267* (2013.01)

(58) Field of Classification Search
CPC ....... A61B 5/4528; A61B 5/01; A61B 5/4836; A61B 5/6847; A61B 5/7267; A61B 5/076; A61B 5/7282; A61B 5/7264; A61B 5/6878; G16H 10/60; G06N 20/00
See application file for complete search history.

(56) References Cited

U.S. PATENT DOCUMENTS

| 8,956,418 | B2 * | 2/2015 | Wasielewski | G16H 40/63 |
| | | | | 623/20.14 |
| 2006/0253259 | A1 * | 11/2006 | Fernandez | A61B 5/411 |
| | | | | 703/11 |
| 2022/0133218 | A1 | 5/2022 | Bose et al. | |

FOREIGN PATENT DOCUMENTS

| CN | 116386794 A | | 7/2023 | |
| JP | 2023-099512 A | | 7/2023 | |
| KR | 20200123796 A | * | 10/2020 | G10L 25/66 |

OTHER PUBLICATIONS

Disclosed Anonymously, "Method and Apparatus for Improved Patient Management", https://priorart.ip.com/IPCOM/000159365, IPCOM000159365D, Oct. 18, 2007, 5 pages.
Umile Giuseppe Longo, et al., "Biosensors for Detection of Biochemical Markers Relevant to Osteoarthritis", https://www.researchgate.net/publication/348748751, Jan. 24, 2021, 13 pages.

(Continued)

*Primary Examiner* — Carl H Layno
*Assistant Examiner* — Maria Catherine Anthony
(74) *Attorney, Agent, or Firm* — CHIP LAW GROUP (57) ABSTRACT

A computer system provides patient monitoring and treatment using implanted biosensors. Data associated with a target joint of a patient is collected via one or more implanted biosensors. A plurality of feature values are extracted from the data. The plurality of feature values are processed using a trained classification model to select a recommendation. The recommendation is provided to mitigate hemophilia-related injury to the target joint. Embodiments of the present invention further include a method and program product for providing patient monitoring and treatment using implanted biosensors in substantially the same manner described above.

18 Claims, 6 Drawing Sheets

(56) References Cited

OTHER PUBLICATIONS

J.M. Teitel, et al., "Orthopaedic surgery in haemophilia patients with inhibitors: a practical guide to haemostatic, surgical and rehabilitative care", https://onlinelibrary.wiley.com/doi/abs/10.1111/j.1365-2516.2008.01840.x, Haemophilia (2009), 15, 227-239, 13 pages.

"Ultrasonography in Hemophilic Joint Disease and Serum Markers", https://ichgcp.net/clinical-trials-registry/NCT02634918, downloaded from the internet on May 27, 2021, 14 pages.

Bülent Atilla, et al., "Musculoskeletal treatment in haemophilia", https://www.researchgate.net/publication/333573926, EOR, vol. 4, Jun. 2019, 10 pages.

Andreas Tiede, et al., "International recommendations on the diagnosis and treatment of acquired hemophilia A", https://www.researchgate.net/publication/341225503, Haematologica 2020, vol. 105(7):1791-1801, May 2020, 12 pages.

J.L. Arlett, et al., "Comparative advantages of mechanical biosensors", https://www.ncbi.nlm.nih.gov/pmc/articles/PMC3839312/, Nat Nanotechnol. Apr. 2011 ; 6(4): doi:10.1038/nnano.2011.44., 28 pages.

Abu Ilius Faisal, et al., "Monitoring Methods of Human Body Joints: State-of-the-Art and Research Challenges", https://www.mdpi.com/1424-8220/19/11/2629, Sensors 2019, 19, 2629; doi:10.3390/s19112629, Jun. 10, 2019, 39 pages.

Enrica Papi, et al., "A knee monitoring device and the preferences of patients living with osteoarthritis: a qualitative study", https://bmjopen.bmj.com/content/5/9/e007980, BMJ Open 2015;5:e007980. doi: 10.1136/bmjopen-2015-007980, 8 pages.

David Okhiria, et al., "Non-Invasive Measurement of Stress Levels in Knee Implants Using a Magnetic-Based Detection Method", https://ieeexplore.ieee.org/document/7393854, IEEE Transactions on Magnetics, vol. 52, No. 5, May 2016, 4 pages.

Biophen™ FVIII:C Hemophilia A |FVIII Assay, Retrieved from: https://web.archive.org/web/20220123213028/http://www.hyphen-biomed.com/products/factor-assays/fviiic-clotting-chromogenic-and-immunological-assays/biophen-fviiic, Jan. 23, 2022, 1 page.

Chaglla, et al. , Measurement of Core Body Temperature Using Graphene-Inked Infrared Thermopile Sensor, Sensor, Aug. 14, 2018, 8 pages.

Clausen et al., Development of Clinically Relevant Implantable Pressure Sensors: Perspectives and Challenges, Sensors (Basel), Sep. 22, 2014, pp. 17686-17702.

Duncan,, et al., Nijmegen-Bethesda Assay to Measure Factor VIII Inhibitors, 10.1007/978-1-62703-339-8_24, Jan. 1, 2013 pp. 321-333.

Gu, et al., Evaluation of the Activated Partial Thromboplastin Time Assay for Clinical Monitoring of Pegylated Recombinant Factor Viii (Bay 94-9027) for Haemophilia A, Retrieved from: https://doi.org/10.1111/hae.12374, Jan. 24, 2014, 8 pages.

Hosnijeh, et al., Association Between Biomarkers of Tissue Inflammation and Progression of Osteoarthritis: Evidence From the Rotterdam Study Cohort, Arthritis Research & Therapy, Apr. 1, 2016, 10 pages.

Hydroxyapatite binding Antibodies, Retrieved from: https://www.thermofisher.com/antibody/primary/panther/hydroxyapatite%20binding, Retrieved date Apr. 10, 2025, 8 pages.

Karipott, et al., Clinical Potential of Implantable Wireless Sensors for Orthopedic Treatments, Oct. 19, 2017, vol. 15, 2018—Issue 4, pp. 255-264.

Key Findings: New Method Designed to Detect the Type of Antibodies Linked to Inhibitor Development Among People with Hemophilia A and B, Retrieved from: https://archive.cdc.gov/www_cdc_gov/ncbddd/hemophilia/features/kf-detect-antibodies-inhibitor.html#:~:text=The%20study%20showed%20that%20people,4%2C%20or%20IgG4), Oct. 10, 2023, 3 pages.

Pandey, et al. ,Minimally Invasive Platforms in Biosensing, Frontiers in Bioeng and Biotech, Aug. 31, 2020, vol. 8, Article 894, 10 pages.

Thin-Film Pressure Sensors, Retrieved from: https://www.tekscan.com/thin-film-pressure-sensors, Retrieved date Apr. 10, 2025, 2 pages.

Wachs et al., Elementary Implantable Force Sensor, Adv Biosens Bioelectron, Dec. 2013, 17 pages.

Zhou, et al., Optofluidic Sensor for Inline Hemolysis Detection on Whole Blood, ACS Sens., Feb. 23, 2018, vol. 3, pp. 784-791.

\* cited by examiner

PATIENT MONITORING AND TREATMENT USING IMPLANTED BIOSENSORS

BACKGROUND

1. Technical Field

Present invention embodiments relate to implantable biosensors, and more specifically, to utilizing implanted biosensors to monitor the joint health of patients and to provide health care to patients.

2. Discussion of the Related Art

Hemophilia, a genetic disorder in which blood fails to clot properly, is one of the deadliest and well-known congenital disorders. Hemophilia occurs due to the inability of the liver to produce essential proteins, and includes two different types: Hemophilia A occurs when the body cannot synthesize clotting factor VIII, and Hemophilia B occurs when the body cannot synthesize clotting factor IX. Due to recurrent hemorrhages in various joints, such as elbows or knees, the joints become weaker over time; typically, one joint in particular, referred to as a "target" joint, behaves as the weak link. If a target joint is not treated properly from a young age, the target joint can quickly become deformed, eventually degenerating to a point at which permanent damage occurs. Degeneration of a target joint leads to reduced mobility and pain, thus adversely affecting the patient's quality of life. Accordingly, treatments for hemophilia may seek to protect a target joint in particular.

SUMMARY

According to one embodiment of the present invention, a computer system provides patient monitoring and treatment using implanted biosensors. Data associated with a target joint of a patient is collected via one or more implanted biosensors. A plurality of feature values are extracted from the data. The plurality of feature values are processed using a trained classification model to select a recommendation. The recommendation is provided to mitigate hemophilia-related injury to the target joint. Embodiments of the present invention further include a method and program product for patient monitoring and treatment using implanted biosensors in substantially the same manner described above.

BRIEF DESCRIPTION OF THE DRAWINGS

Generally, like reference numerals in the various figures are utilized to designate like components.

DETAILED DESCRIPTION

Present invention embodiments relate to implantable biosensors, and more specifically, to utilizing implanted biosensors to monitor the joint health of patients and to provide health care to patients. In particular, the biosensors may be used to monitor the joints of hemophiliacs, as their joints may be particularly susceptible to degenerative diseases due to the nature of hemophilia. Typically, while all joints may suffer damage over time due to hemorrhaging, a target joint often presents itself as a weak link, and as such, may suffer recurrent bleeding.

Since an untreated or poorly-managed target joint can essentially lead to a positive feedback loop of increasing degeneration, health care providers aim to identify and treat target joints as early as possible. However, identifying a target joint can be difficult, especially in children, and since hemophilia is a congenital disorder, most hemophiliacs suffer permanent damage of a joint, typically a knee or elbow. In severe cases, even hemophiliacs who receive regular treatment (e.g., clotting factor replacement therapy) typically lose use of their knee joints in their early twenties, and require total knee replacement surgery. However, these surgeries only restore a portion of the natural ability of a knee, and the patients will either have to live with the artificial knee or receive additional knee replacement surgeries over time.

Since surgical procedures on hemophiliac patients can be especially risky and because replacement joints cannot fully reproduce a joint's natural ability, it is a goal of health care providers to prevent the need for joint surgeries, or at least prolong the need for surgeries for as long as possible. Accordingly, present invention embodiments utilize implanted biosensors to monitor the status of a target joint in order to greatly minimize the amount of time that an internal bleed goes undetected, thereby enabling rapid treatment and accordingly prolonging the lifespan of a natural joint. In particular, present invention embodiments use biochemical sensors to monitor markers in blood, mechanical sensors to measure strain and other mechanical properties of a joint, and/or synovial fluid sensors to measure synovial fluid-related parameters of a joint. Machine learning techniques can be employed to perform data cleansing, and a trained classification algorithm can then provide recommendations relating to a patient's target joint.

Accordingly, present invention embodiments provide the practical application of improving the field of patient monitoring and treatment by more rapidly identifying internal bleeding in the target joints of hemophiliac patients, thereby greatly prolonging the use of patients' natural joints. Present invention embodiments improve hemorrhage detection by providing a novel machine-learning based approach to reduce the noise in collected data. Conventional approaches struggle to analyze data collected from a patient due to noise in the data, which is introduced from internal and external sources, including patient movement, the patient's environment (due to external forces acting on the patient, ambient temperature levels, etc.), and any other sources. In contrast, present invention embodiments remove noise from data by employing machine learning techniques to establish threshold values for each type of biosensor in order to perform data cleansing operations on data derived from each type of biosensor.

Thus, the embodiments presented herein have improved accuracy over conventional techniques, which struggle to account for a patient's movement (which introduces noise to collected data). Moreover, present invention embodiments employ a machine learning model that is specifically trained to perform multi-class classification to produce recommendations, including orthopedic and hematological interventions that can prolong the life of a natural joint. Thus, present invention embodiments improve the technical field of hemophiliac-related hemorrhage detection by more quickly and more accurately identifying internal bleeds, and providing actionable recommendations to mitigate detected bleeds. Additionally, the outcomes of patients can be used to update the classification model, thereby providing a solution that is increasingly accurate over time.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
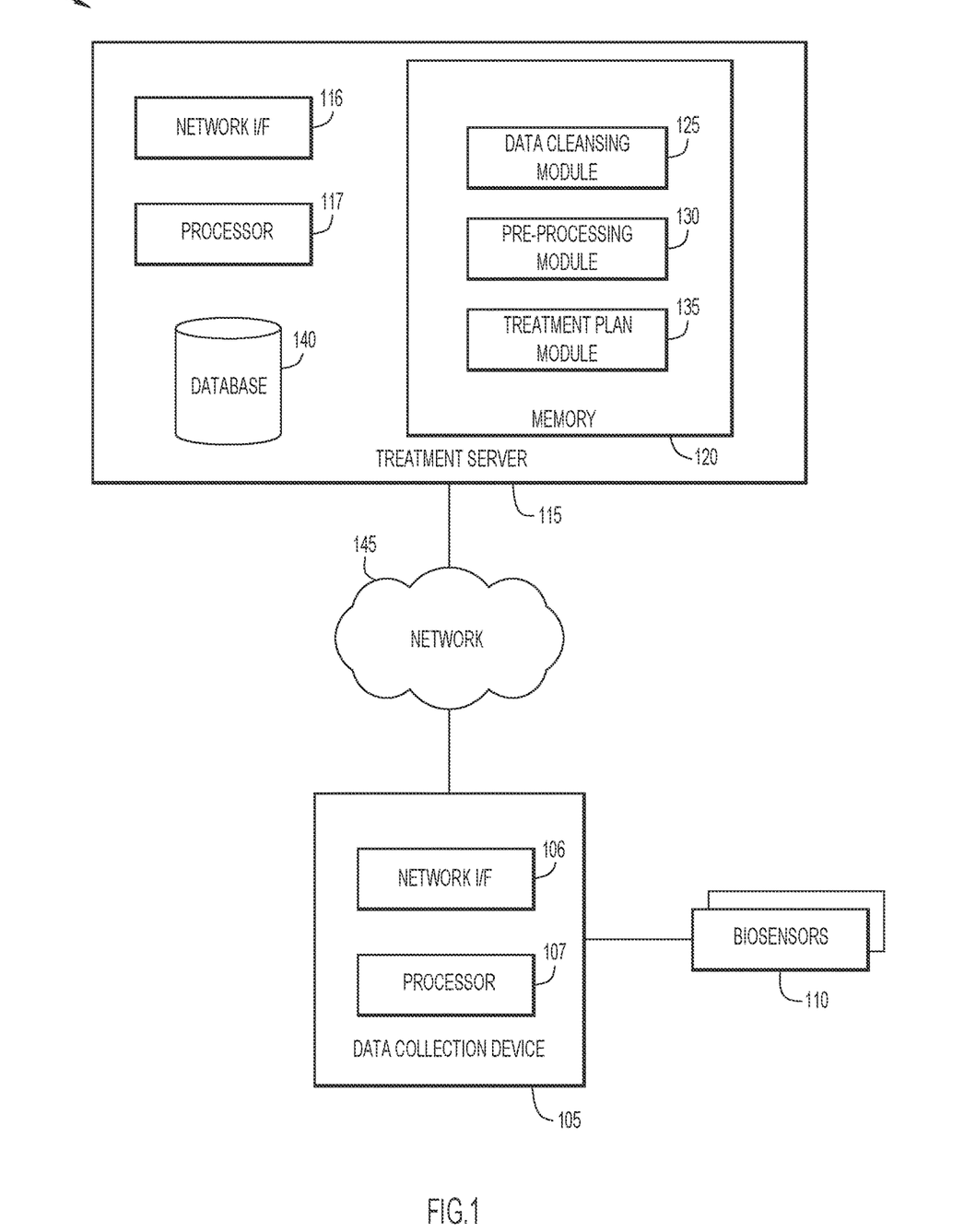
FIG. 1 is a block diagram depicting a computing environment for patient monitoring and treatment using implanted biosensors in accordance with an embodiment of the present invention.

Present invention embodiments will now be described in detail with reference to the Figures. FIG. 1 is a block diagram depicting a computing environment 100 for patient monitoring and treatment using implanted biosensors in accordance with an embodiment of the present invention. As depicted, computing environment 100 includes a data collection device 105, biosensors 110, a treatment server 115, and a network 145. It is to be understood that the functional division among components of computing environment 100 have been chosen for purposes of explaining present invention embodiments and is not to be construed as a limiting example.

Data collection device 105 includes a network interface (I/F) 106 and at least one processor 107. Data collection device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of data collection device 105 to send and receive data over a network, such as network 145. In general, data collection device 105 receives or obtains data from implanted biosensors, such as biosensors 110, and passes the data along to a server (e.g., treatment server 115) for further processing. In some embodiments, data collection device 105 is a microcontroller. Data collection device 105 may include internal and external hardware components, as depicted and described in further detail with respect to FIG. 7.

Network interface 106 enables components of data collection device 105 to send and receive data over a network, such as network 145. In some embodiments, network interface 106 includes a plurality of interfaces, such as wired and/or wireless interfaces. Network interface 106 may include a near field communication (NFC) interface, body area network (BAN) interface, or similar interfaces to support the wireless exchange of data between data collection device 105 and biosensors 110, which may be implanted in a patient's target joint. In one embodiment, data collection device 105 utilizes a first, short-range wireless network interface to obtain data from biosensors 110, and a second wired or wireless network interface to provide the data to treatment server 115.

In some embodiments, processor 107 pre-processes data obtained from biosensors 110 and/or otherwise prepares data for transmission for further processing (e.g., by organizing, data, compressing data, etc.). Processor 107 may organize data by sensor type and/or may add timestamps to data collected by biosensors 110 to yield time-series data.

Biosensors 110 may include any transducers for converting physical, chemical, and/or biological phenomena into electrical signals. In various embodiments, biosensors 110 may include temperature sensors, pressure sensors, stress sensors, strain sensors, acceleration sensors, rotational sensors, biochemical sensors, and the like. In some embodiments, biosensors 110 include a surface to which specific ions or organic molecules (including macromolecules and monomers), such as antibodies, carbohydrates, calcium, etc., can bond. When a specific ion or organic molecule of interest bonds to a biosensor's surface, the surface's electrical conductance changes, and the resulting change in voltage can be used to determine an in vivo concentration of the specific ion or organic molecule. Biosensors 110 may be implantable via microsurgical techniques (e.g., injection into a target joint), and may include technologies such as microelectromechanical system (MEMS) sensors, two-dimensional nanomaterial sensors (e.g., graphene-based sensors), and the like. In some embodiments, biosensors 110 may transmit data using power obtained from data collection device 105, which can be provided via wireless energy-transmission techniques. Biosensors 110 are depicted and described in further detail with respect to FIGS. 3-5.

Treatment server 115 includes a network interface (I/F) 116, at least one processor 117, memory 120, and a database 140. Memory 120 may include a data cleansing module 125, a pre-processing module 130, and a treatment plan module 135. Treatment server 115 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 116 enables components of treatment server 115 to send and receive data over a network, such as network 145. In general, treatment server 115 processes and analyzes data collected from biosensors 110 to identify internal bleeds in the target joints of hemophiliac patients. Additionally or alternatively, treatment server 115 classifies hemorrhagic events to recommend various treatment plans for a patient. Treatment server 115 may include internal and external hardware components, as depicted and described in further detail with respect to FIG. 7.

Data cleansing module 125, pre-processing module 130, and treatment plan module 135 may include one or more modules or units to perform various functions of present invention embodiments described below. Data cleansing module 125, pre-processing module 130, and treatment plan module 135 may be implemented by any combination of any quantity of software and/or hardware modules or units, and may reside within memory 120 of treatment server 115 for execution by a processor, such as processor 117.

Data cleansing module 125 may receive data, via data collection device 105, that is collected from biosensors 110, and may perform data cleansing and/or noise reduction operations on the data to exclude any data that does not meet certain predefined or determined criteria. In some embodiments, data cleansing module 125 compares data, for each type of biosensor 110, to a predetermined threshold, and if the data violates the threshold, then the data may be discarded. Thus, for example, a large value for a pressure reading may be discarded, as the value may be caused by a quick movement of the patient and thus not be indicative of a joint's typical pressure.

In some embodiments, data cleansing module 125 utilizes a machine learning model to determine dynamic thresholds for each type of biosensor data. The machine learning model may be trained according to conventional or other machine learning techniques; in some embodiments, the machine learning model is a neural network that is trained to output threshold values based on inputs that describe a patient's target joint and other relevant factors. In particular, data cleansing module 125 may employ a machine learning model that outputs thresholds for data cleansing based on inputs such as the hemophiliac condition of a patient (e.g., mild or severe), the specific joint (e.g., elbow, knee, ankle, etc.), the target joint's flexibility (e.g., normal, hypermobile, etc.), and a joint condition of the patient (e.g., better than six months ago, worse than six months ago, etc.). The machine learning model can be trained using a labeled set of training data that includes example thresholds that are labeled with one or more of the input parameter values (e.g., condition of patient, target joint affected, target joint flexibility, target joint condition). Thus, the machine learning model can learn thresholds for a variety of inputs, including combinations of inputs for which example combinations of inputs are not provided.

Using the predetermined and/or machine-learned thresholds, data cleansing module 125 cleanses the raw data obtained from biosensors 110. After cleansing the data, the results are provided to pre-processing module 130 for further processing.

Pre-processing module 130 performs pre-processing operations on the cleansed data to extract feature values from the biosensor data. The feature values that are extracted may depend on the type of biosensor from which each set of data is extracted.

In some embodiments, pre-processing module 130 processes the cleansed data to determine a rate of change of osteoarthritis stage, including a daily change, a weekly change, a monthly change, as well as standard deviations. An osteoarthritis stage can be determined based on joint temperature data, synovial fluid pressure data, hydroxyapatite levels, osteocalcin levels, volume of synovium, user-reported data, health care provider-reported data, and the like.

In some embodiments, pre-processing module 130 determines a rate of change of temperature in a target joint, such as a daily change, a weekly change, a monthly change, as well as standard deviations. The temperature data may be obtained by a biosensor that measures temperatures using conventional or other techniques.

In some embodiments, pre-processing module 130 determines a rate of change of cartilage distribution, including a daily change, a weekly change, a monthly change, as well as standard deviations. The cartilage stress distribution may be determined according to mechanical parameters such as strain, stress, friction, pressure, and the like.

In some embodiments, pre-processing module 130 determines a rate of change of synovial fluid pressure or volume, including a daily change, a weekly change, a monthly change, as well as standard deviations. Synovial fluid pressure can be determined using a biosensor 110 implanted within the synovium of a target joint, and volume can be determined based comparing pressure data to an expected pressure of the synovium at the particular joint, body measurements of the patient, and the like.

In some embodiments, pre-processing module 130 determines a rate of change of antihemophilic factor (AHF) levels, including a daily change, a weekly change, a monthly change, as well as standard deviations. AHF levels can be determined using biosensors 110 that perform an assay to determine AHF concentrations directly or indirectly based on metabolites or the presence of other organic molecules.

In some embodiments, pre-processing module 130 determines a rate of change of Bethesda units (BUs), including a daily change, a weekly change, a monthly change, as well as standard deviations. BUs can be detected using biosensors 110 to perform a Bethesda assay to detect the presence of Factor VIII inhibitors (i.e., anti-factor VIII antibodies).

In some embodiments, pre-processing module 130 determines a rate of change of hemoglobin levels, including a daily change, a weekly change, a monthly change, as well as standard deviations. Hemoglobin levels can be determined using optofluidic sensors to measure hemoglobin content in a fluid.

In some embodiments, pre-processing module 130 determines a rate of change of blood levels in synovial fluid, including a daily change, a weekly change, a monthly change, as well as standard deviations. Blood levels in synovial fluid can be detected based on capillary action measurements using micro-needle-based biosensors 110.

When pre-processing module 130 extracts the feature values from the cleansed biosensor data, pre-processing module 130 may provide the feature values to treatment plan module 135.

Treatment plan module 135 may employ one or more trained machine learning models to analyze the extracted feature values in order to assess a condition of a target joint and to recommend treatments for the target joint. In some embodiments, treatment plan module 135 employs conventional or other machine learning techniques to map feature values to a particular recommendation to mitigate injury to a target joint. The machine learning model may include a conventional or other model type, such as a neural network, a support vector machine, a Hidden Markov model, an adversarial network model, and the like. In some embodiments, the machine learning model is an extreme gradient boosting-based model that performs multi-class classifications to provide recommendations based on the input feature values.

The machine learning model may be trained to classify specific feature values, or particular combinations of feature values, to conditions of a target joint and/or to treatment recommendations for the target joint. In particular, a supervised machine learning model can be trained using training data that includes feature values for one or more extracted feature, each feature value being provided with a label indicating whether that feature value is associated with an internal hemorrhage, and if so, a magnitude of the internal hemorrhage. The magnitude or condition of a target joint can be associated with particular treatment recommendations, and those associations can be learned using labeled training data that includes examples of joint conditions and the corresponding treatment options. Thus, the machine learning model may be trained to output mappings of feature values to joint conditions, which in turn are used to recommended treatments.

The machine learning model may be trained using training data that contains examples of past mappings of treatment values to known joint conditions and/or treatments that were used to provide care to previous patients and are tagged with positive or negative patient outcomes (e.g., indications of whether the recommendation satisfactorily mitigated issues in a patient's target joint). Thus, treatment plan module 135 may learn from successful and/or unsuccessful previous mappings to more accurately map feature values to particular target joint conditions and/or recommendations.

Database 140 may include any non-volatile storage media known in the art. For example, database 140 can be implemented with a tape library, optical library, one or more independent hard disk drives, or multiple hard disk drives in a redundant array of independent disks (RAID). Similarly, data in database 140 may conform to any suitable storage architecture known in the art, such as a file, a relational database, an object-oriented database, and/or one or more tables. In some embodiments, database 140 may store data including trained machine learning models, training data, raw biosensor data, cleansed biosensor data, extracted feature values, historical mappings of feature values to target joint conditions, and/or historical mappings of target joint conditions to recommendations.

Network 145 may include a local area network (LAN), a wide area network (WAN) such as the Internet, or a combination of the two, and includes wired, wireless, or fiber optic connections. In general, network 145 can be any combination of connections and protocols known in the art that will support communications between data collection device 105 and treatment server 115 via their respective network interfaces in accordance with embodiments of the present invention.

Figure 2:
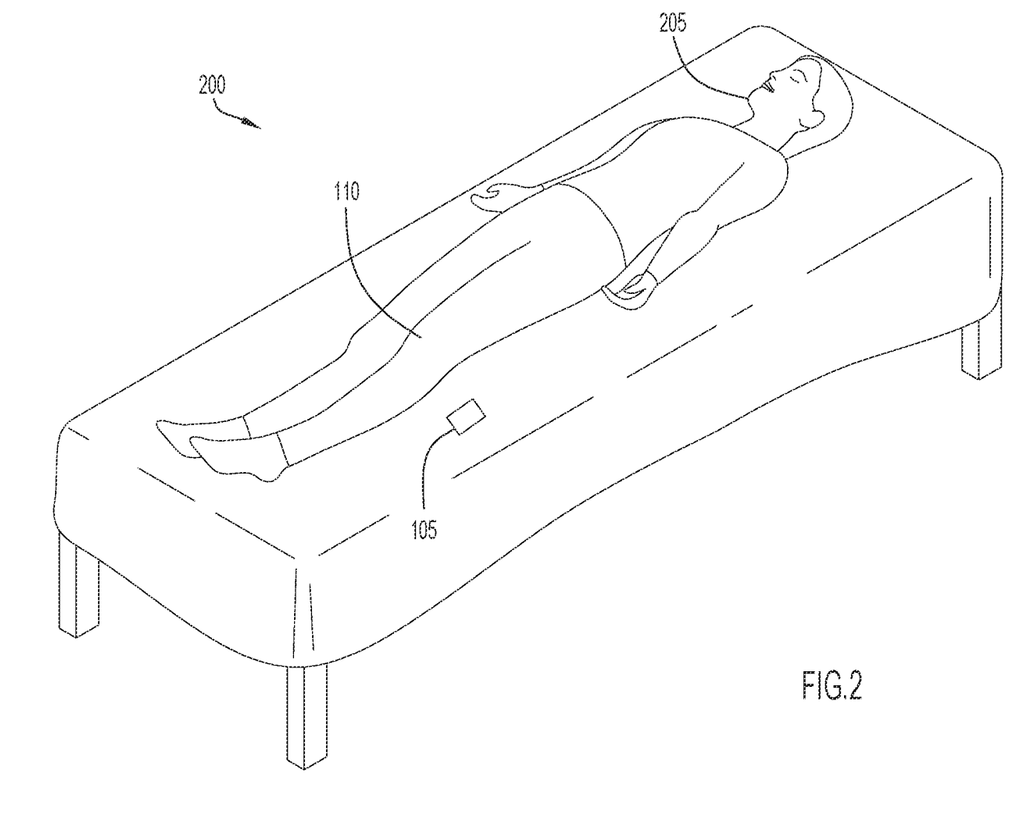
FIG. 2 is a diagram depicting a user environment in accordance with an embodiment of the present invention.

FIG. 2 is a diagram depicting a user environment 200 in accordance with an embodiment of the present invention. As depicted, user environment 200 includes a user 205 (e.g., a hemophiliac patient), data collection device 105, and one or more biosensors 110. The biosensors 110 may be implanted in a target joint, which is the left knee of user 205 in the depicted embodiment. In some embodiments, biosensors 110 may be positioned in or around a target joint, including one or more biosensors 110 within the synovium, one or more biosensors 110 in a position suitable to monitor circulatory system components of the target joint, and one or more biosensors 110 in a position suitable to obtain mechanical measurements of the target joint, such as stress and strain.

Data collection device 105 may wirelessly obtain data from biosensors 110. The data obtained by data collection device 105 may in turn be provided to a server, such as treatment server 115, for additional processing. In some embodiments, data collection device 105 is a wearable device or may be carried in a pocket, etc., of user 205. Data collection device 105 may obtain data from biosensors 110 continuously, according to a predetermined schedule, or on an ad hoc basis (e.g., as new data becomes available). Similarly, data collection device 105 may provide data to treatment server 115 in a continuous manner, in an ad hoc manner, or according to a predetermined schedule.

Figure 3:
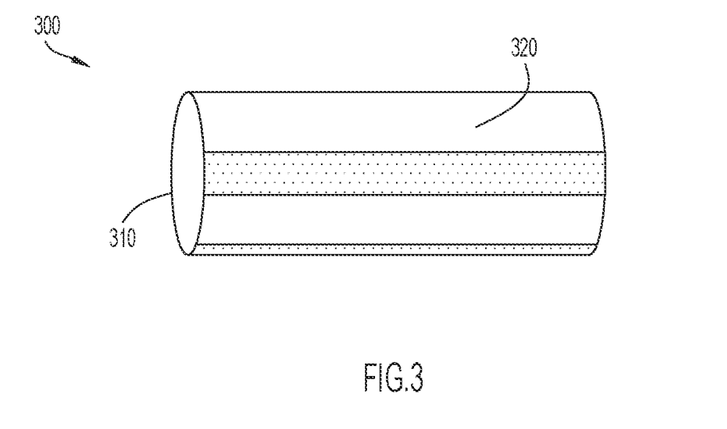
FIG. 3 depicts an implantable biosensor in accordance with an embodiment of the present invention.

FIG. 3 depicts an implantable biosensor 300 in accordance with an embodiment of the present invention. Implantable biosensor 300 may be included in biosensors 110, as depicted and described in further detail with respect to FIG. 1. As depicted, implantable biosensor 300 includes a synovial fluid pressure sensor 310 and an outer body 320. Synovial fluid pressure sensor 310 may include any transducer for converting a pressure to an electric signal, such as a piezoelectric transducer. Outer body 320 may be coated in a material to provide an array of sensors for detecting antibodies. As antibodies attach to the coating of outer body 320, the electrical conductance or other properties of outer body 320 may change in a manner that is correlated with the concentration of antibodies in the fluid in which implantable biosensor 300 is inserted.

Figure 4:
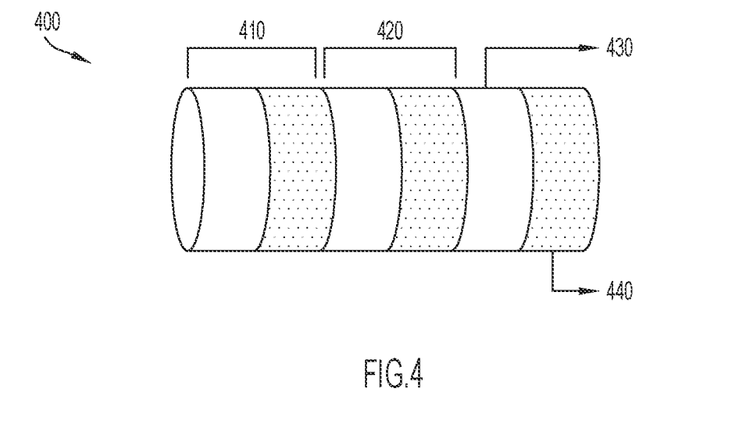
FIG. 4 depicts an implantable biosensor in accordance with an embodiment of the present invention.

FIG. 4 depicts an implantable biosensor in accordance with an embodiment of the present invention. Implantable biosensor 400 may be included in biosensors 110, as depicted and described in further detail with respect to FIG. 1. Implantable biosensor 400 may correspond to an internal view the embodiment of implantable biosensor 300, as depicted and described in FIG. 3, or implantable biosensor 400 may be another biosensor embodiment.

As depicted, implantable biosensor 400 includes blood-related elements 410, musculoskeletal-related elements 420, a transducer 430, and a battery 440. The blood-related elements 410 may include one or more labs-on-a-chip or microscale assays for collecting biosensor data associated with blood-related parameters, and the musculoskeletal-related elements 420 may include one or more biosensors for collecting mechanical data, such as stress and strain. Transducer 430 may include one or more transducer components for converting biosignals obtained by other elements (e.g., blood-related elements 410 and/or musculoskeletal-related elements 420) into an electrical signal. Battery 440 may provide power to implantable biosensor 400 to power its data-collecting components and/or a transmitter (not shown).

Figure 5:
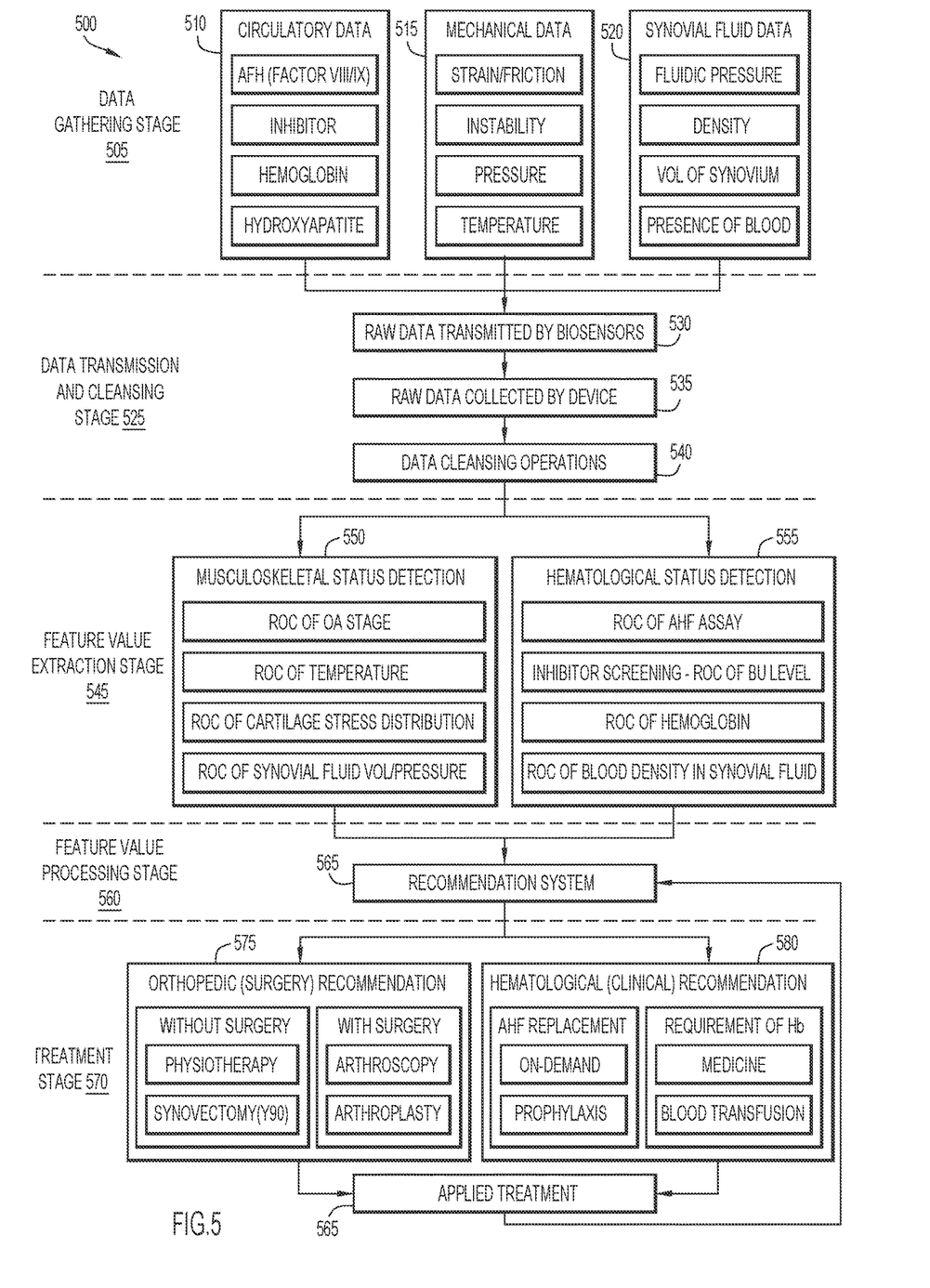
FIG. 5 is a block diagram depicting a workflow for patient monitoring and treatment in accordance with an embodiment of the present invention.

FIG. 5 is a block diagram depicting a workflow 500 for patient monitoring and treatment in accordance with an embodiment of the present invention. As depicted, workflow 500 includes a data gathering stage 505, a data transmission and cleansing stage 525, a feature value extraction stage 545, a feature value processing stage 560, and a treatment stage 570.

Data gathering stage 505 includes gathering of circulatory data 510, mechanical data 515, and synovial fluid data 520. As depicted, circulatory data 510 can include AHF data, including clotting factor VIII, clotting factor IX, or both, inhibitor data, hemoglobin data, and hydroxyapatite data. AHF data can be used to determine the level of degradation of AHF in a patient's blood, which is correlated with an increased chance at an internal bleed. Since hemophiliacs cannot produce their own AHF, the presence of AHF is due to AHF therapy, which the patient must receive regularly. AHF levels can be determined using biosensors that perform a one-stage activated partial thromboplastin time (aPTT)-based assay, a two-stage chromogenic assay, or similar assays.

Inhibitor data may be gathered by a biosensor that performs a Bethesda assay to determine Bethesda units (BUs) in a fluid. The Bethesda assay measure anti-factor VIII antibodies (e.g., IgG4 and/or IgG1 antibodies), which are produced by the body and inhibit the regular activity of AHF in blood. The inhibitors can include a tissue factor pathway inhibitor (TFPI) and/or antithrombin. The inhibitor data can be collected via a biosensor by performing a Nijmegen-Bethesda assay and/or by performing a fluorescent immunoassay (FIA) using a coating on a biosensor to detect the presence of inhibitors.

Hemoglobin data can be obtained by biosensors that include optofluidic sensors composed of nanofilters that perform evanescent-wave absorption measurements of hemoglobin.

Hydroxyapatite data can be obtained by biosensors that detect biochemical markers, such as the c-reactive protein biomarker, CRPM, which can give an early warning of joint inflammation and/or bone erosion. Thus, the sensing surface of a biosensor can be coated with a detecting antibody, such as an anti-CRPM antibody, and changes in voltage can be associated with biomarker concentration. Additionally or alternatively, antibodies that bind to osteocalcin, an organic molecule that is released when bone degrades, to similarly identify hydroxyapatite levels.

Mechanical data 515 may include strain or friction data, joint instability data, pressure data, and temperature data. Pressure data can be collected via capacitive pressure sensors, which can include a polyethylene-coated or similar needle containing a pressure transducer. Strain data can be collected using a piezoresistive strain transducer. Cartilage stress distribution data can be collected using force plate sensors, and temperature data can be collected using a graphene-inked infrared thermopile sensor or other temperature-gathering micro-electromechanical systems.

Synovial fluid data 520 may be collected using a biosensor that assesses capillary action in one or more microneedles. The capillary action may indicate properties of synovial fluid, such as viscosity, that are indicative of density and/or the presence of blood. Additionally, pressure data can be collected from the synovium similarly to how pressure data is collected for mechanical data of the target joint.

Data transmission and cleansing stage 525 includes operation 530, in which raw data is transmitted by the biosensors, operation 535, in which the transmitted raw data is collected by a device (e.g., data collection device 105), and operation 540, in which data cleansing operations are performed (e.g., by data cleansing module 125). Once the raw data is cleansed, the results can be provided to pre-processing module 130, and workflow 500 progresses to the feature value extraction stage 545.

At feature value extraction stage 545, pre-processing module 130 processes the data to extract feature values for a variety of relevant features. As shown, two main categories of feature data may be obtained by performing musculoskeletal status detection 550 and hematological status detection 555. The musculoskeletal data may include a rate of change of an osteoarthritis stage, a rate of change of a temperature, a rate of change of a cartilage stress distribution, and a rate of change of a synovial fluid volume or pressure. The hematological data may include a rate of change of an AHF assay, a rate of change of inhibitor levels, a rate of change of hemoglobin levels, and a rate of change of blood levels in synovial fluid.

The extracted feature values may be processed by a recommendation system 565 (e.g., treatment plan module 135 and its trained model(s)) at the feature value processing stage 560. Recommendation system 565 may determine a status of the target joint based on the feature values, and may output a variety of different recommendations depending on the status of the target joint.

As shown in treatment stage 570, recommendations may include orthopedic (surgery) recommendations 575, and hematological (clinical) recommendations 580. The orthopedic recommendations can include non-surgical recommendations, such as a physiotherapy or change in physiotherapy, and a radiation synovectomy (e.g., using ytterium-90), or surgical recommendations, such as an arthroscopy or arthroplasty. Hematological recommendations 580 can include either an on-demand or prophylactic AHF replacement treatment, or hemoglobin-targeted treatments, such as a medication to raise hemoglobin levels or a blood transfusion.

The treatment, or combination of treatments, may be applied at operation 585, and the results can be fed back into recommendation system 565 in order for the machine learning components to improve in accuracy over time.

Figure 6:
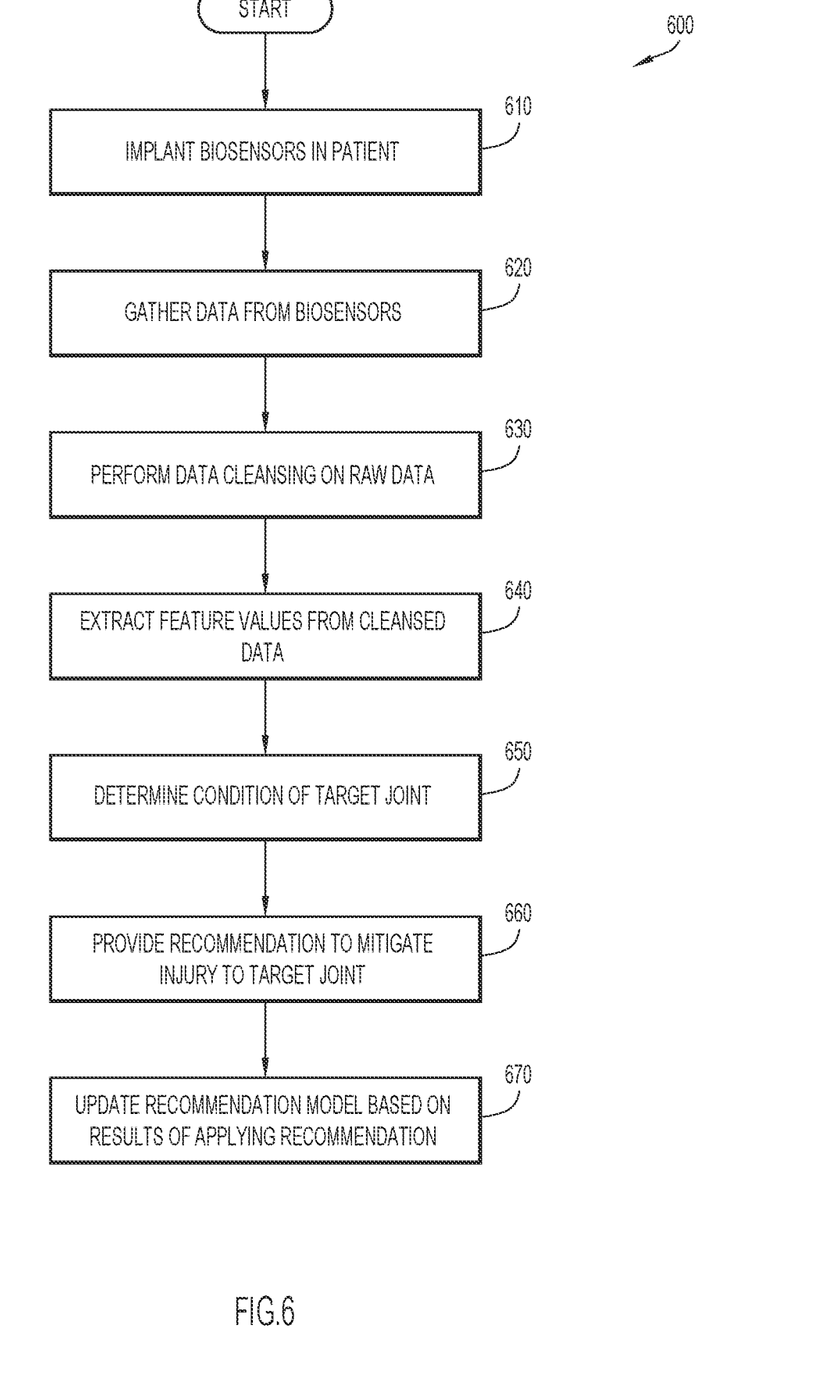
FIG. 6 is a flow chart depicting a method of monitoring and treating a patient using implanted biosensors in accordance with an embodiment of the present invention.

FIG. 6 is a flow chart depicting a method 600 of monitoring and treating a patient using implanted biosensors in accordance with an embodiment of the present invention.

Biosensors are implanted in a patient at operation 610. Biosensors can be implanted in a target joint of a patient using microsurgery or other techniques, including minimally-invasive techniques. The location of the biosensors may be verified in order to ensure that proper data collection will be achieved. Depending on the type of biosensor(s) that are implanted, the biosensors may be implanted within a synovial membrane or outside of a synovial membrane. The biosensors may be inserted in or adjacent to a capillary bed associated with a target joint.

Data is gathered from the biosensors at operation 620. Data may obtained by the biosensors, which in turn may share the data with another device (e.g., data collection device 105) using wireless communication, as the biosensors are implanted within a patient. The gathered data may then be uploaded to a server, such as treatment server 115, for further processing.

Data cleansing is performed on the raw data at operation 630. Data cleansing may be performed by discarding outliers and/or any data values that exceed predetermined or machine-learned thresholds. Different thresholds may be utilized for each data type; for example, one threshold is applied to cleanse hemoglobin data, and another threshold is applied to cleanse stress data. The thresholds may include upper limits, lower limits, or both upper and lower limits.

Feature values are extracted from the cleansed data at operation 640. The cleansed data can be processed to extract features, including rates of changes of the various features being tracked, and corresponding standard deviations.

A condition of a target joint is determined at operation 650. The feature values are provided to a multi-class classification model, which identifies a particular condition of the target joint, and based on the condition, determines a recommendation. The condition can include the presence or absence of an internal hemorrhage, the severity of a hemorrhage, and/or other conditions related to a target joint.

A recommendation is provided to mitigate injury to the target joint at operation 660. The recommendation may be selected using a machine learning model that is trained using associations between target joint conditions and corresponding treatments; accordingly, the machine learning model may output one or more treatment options based on the determined condition of the target joint.

The recommendation model is updated based on the results of applying the recommendation at operation 670. When the recommended treatment is applied to the patient, the results of applying the treatment are recorded and can be used as additional training data for the recommendation model. Thus, the recommendation model may update over time to improve the accuracy and efficacy of recommendations.

Figure 7:
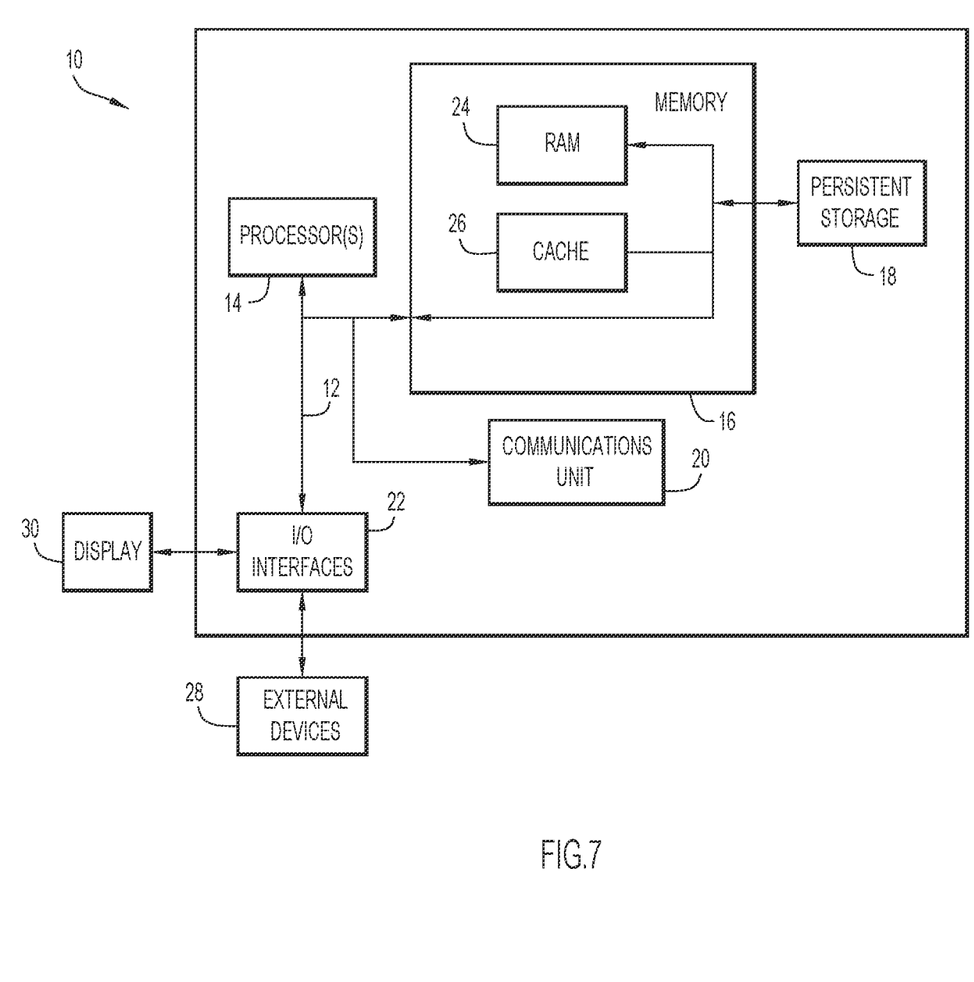
FIG. 7 is a block diagram depicting a computing device in accordance with an embodiment of the present invention.

FIG. 7 is a block diagram depicting components of a computer 10 suitable for executing the methods disclosed herein. Computer 10 may implement data collection device 105 and/or treatment server 115 in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to patient monitoring and treatment using implanted biosensors (e.g., raw biosensor data, cleansed biosensor data, extracted feature values, trained machine learning models, training data, historical mappings of feature values to target joint conditions, and/or historical mappings of target joint conditions to recommendations, etc.) may be stored within any conventional or other data structures (e.g., files, arrays, lists, stacks, queues, records, etc.) and may be stored in any desired storage unit (e.g., database, data or other repositories, queue, etc.). The data transmitted between data collection device 105 and/or treatment server 115 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to patient monitoring and treatment using implanted biosensors (e.g., raw biosensor data, cleansed biosensor data, extracted feature values, trained machine learning models, training data, historical mappings of feature values to target joint conditions, and/or historical mappings of target joint conditions to recommendations, etc.) may include any information provided to, or generated by, data collection device 105 and/or treatment server 115. Data relating to patient monitoring and treatment using implanted biosensors may include any desired format and arrangement, and may include any quantity of any types of fields of any size to store any desired data. The data relating to patient monitoring and treatment using implanted biosensors may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to patient monitoring and treatment using electronic textiles), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving patient monitoring and treatment using implanted biosensors.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, data cleansing module 125, pre-processing module 130, treatment plan module 135, etc.). These systems may include any types of monitors and input devices (e.g., keyboard, mouse, voice recognition, etc.) to enter and/or view information.

It is to be understood that the software (e.g., communications software, server software, data cleansing module 125, pre-processing module 130, treatment plan module 135, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, data cleansing module 125, pre-processing module 130, treatment plan module 135, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to patient monitoring and treatment using implanted biosensors). The database system may be implemented by any number of any conventional or other databases, data stores or storage structures (e.g., files, databases, data structures, data or other repositories, etc.) to store information (e.g., data relating to patient monitoring and treatment using electronic textiles). The database system may be included within or coupled to the server and/or client systems. The database systems and/or storage structures may be remote from or local to the computer or other processing systems, and may store any desired data (e.g., data relating to patient monitoring and treatment using implanted biosensors).

The present invention embodiments may employ any number of any type of user interface (e.g., Graphical User Interface (GUI), command-line, prompt, etc.) for obtaining or providing information (e.g., data relating to patient monitoring and treatment using implanted biosensors), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, providing improved health care to patients by identifying and treating health conditions of joints and other body parts, including providing health care to patients who do not have hemophilia, who have parahemophilia, or who have acquired hemophilia.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for patient monitoring and treatment using implanted biosensors, the computer-implemented method comprising:
    collecting, via the implanted biosensors, data associated with a target joint of a hemophiliac patient, wherein the target joint corresponds to a natural joint of the hemophiliac patient;
    executing data cleansing on the data, prior to execution of extraction of a plurality of feature values from the data, to generate cleansed data, wherein the executing of the data cleansing on the data includes:
        applying a machine learning model to identify different thresholds for each of a plurality of data types of the data; and
        discarding data values for a data type of the plurality of data types that violates a threshold, from the different thresholds, identified for the data type;
    extracting the plurality of feature values from the cleansed data;
    processing the plurality of feature values from the cleansed data using a trained classification model to select a recommendation; and
    providing the recommendation to mitigate hemophilia-related injury to the target joint.

2. The computer-implemented method of claim 1, wherein the data includes one or more of: circulatory data, mechanical data, and synovial fluid data.

3. The computer-implemented method of claim 1, wherein the plurality of feature values extracted from the cleansed data includes one or more of: a rate of change of an osteoarthritis stage, a rate of change of temperature, a rate of change of cartilage stress distribution, a rate of change of synovial fluid pressure, a rate of change of an antihemophilic factor, a rate of change of Bethesda units, a rate of change of hemoglobin, and a rate of change of blood density in synovial fluid.

4. The computer-implemented method of claim 1, wherein the trained classification model includes an extreme gradient boosting model.

5. The computer-implemented method of claim 1, wherein the recommendation includes one or more of: a physiotherapy treatment, a synovectomy treatment, a suggestion to perform a surgical procedure on the target joint after a determined amount of time, an antihemophilic factor replacement treatment, a medical treatment to increase hemoglobin levels, and a blood transfusion treatment.

6. The computer-implemented method of claim 1, further comprising:
    updating the trained classification model based on results of applying the recommendation to the target joint.

7. The computer-implemented method of claim 1, wherein the identified different thresholds are based on one or more inputs, to the machine learning model, corresponding to a hemophiliac condition of the hemophiliac patient, the target joint, target joint flexibility, or a condition of the target joint in a specific time period.

8. A computer system for patient monitoring and treatment using implanted biosensors, the computer system comprising:
    one or more computer processors;
    one or more computer readable storage media;
    program instructions stored on the one or more computer readable storage media for execution by at least one of the one or more computer processors, the program instructions comprising instructions to:
        collect, via the implanted biosensors, data associated with a target joint of a hemophiliac patient, wherein the target joint corresponds to a natural joint of the hemophiliac patient;
        execute data cleansing on the data, prior to execution of extraction of a plurality of feature values from the data, to generate cleansed data, wherein the execution of the data cleansing on the data includes:
            application of a machine learning model to identify different thresholds for each of a plurality of data types of the data; and
            discard of data values for a data type of the plurality of data types that violates a threshold, from the different thresholds, identified for the data type;
        extract the plurality of feature values from the cleansed data;
        process the plurality of feature values from the cleansed data using a trained classification model to select a recommendation; and
        provide the recommendation to mitigate hemophilia-related injury to the target joint.

9. The computer system of claim 8, wherein the data includes one or more of: circulatory data, mechanical data, and synovial fluid data.

10. The computer system of claim 8, wherein the plurality of feature values extracted from the cleansed data includes one or more of: a rate of change of an osteoarthritis stage, a rate of change of temperature, a rate of change of cartilage stress distribution, a rate of change of synovial fluid pressure, a rate of change of an antihemophilic factor, a rate of change of Bethesda units, a rate of change of hemoglobin, and a rate of change of blood density in synovial fluid.

11. The computer system of claim 8, wherein the trained classification model includes an extreme gradient boosting model.

12. The computer system of claim 8, wherein the recommendation includes one or more of: a physiotherapy treatment, a synovectomy treatment, a suggestion to perform a surgical procedure on the target joint after a determined amount of time, an antihemophilic factor replacement treatment, a medical treatment to increase hemoglobin levels, and a blood transfusion treatment.

13. The computer system of claim 8, wherein the program instructions further comprise instructions to:
    update the trained classification model based on results of applying the recommendation to the target joint.

14. A computer program product for patient monitoring and treatment using implanted biosensors, the computer program product comprising one or more non-transitory computer readable storage media collectively having program instructions embodied therewith, the program instructions executable by a computer to cause the computer to:
    collect, via the implanted biosensors, data associated with a target joint of a hemophiliac patient, wherein the target joint corresponds to a natural joint of the hemophiliac patient;
    execute data cleansing on the data, prior to execution of extraction of a plurality of feature values from the data, to generate cleansed data, wherein the execution of the data cleansing on the data includes:
        application of a machine learning model to identify different thresholds for each of a plurality of data types of the data; and discard of data values for a data type of the plurality of data types that violates a threshold, from the different thresholds, identified for the data type;

extract the plurality of feature values from the cleansed data;

process the plurality of feature values from the cleansed data using a trained classification model to select a recommendation; and provide the recommendation to mitigate hemophilia-related injury to the target joint.

15. The computer program product of claim 14, wherein the data includes one or more of: circulatory data, mechanical data, and synovial fluid data.

16. The computer program product of claim 14, wherein the plurality of feature values extracted from the cleansed data includes one or more of:

a rate of change of an osteoarthritis stage, a rate of change of temperature, a rate of change of cartilage stress distribution, a rate of change of synovial fluid pressure, a rate of change of an antihemophilic factor, a rate of change of Bethesda units, a rate of change of hemoglobin, and a rate of change of blood density in synovial fluid.

17. The computer program product of claim 14, wherein the trained classification model includes an extreme gradient boosting model.

18. The computer program product of claim 14, wherein the recommendation includes one or more of: a physiotherapy treatment, a synovectomy treatment, a suggestion to perform a surgical procedure on the target joint after a determined amount of time, an antihemophilic factor replacement treatment, a medical treatment to increase hemoglobin levels, and a blood transfusion treatment.

* * * * *